United States Patent [19]

Aso et al.

[11] Patent Number: 5,094,378

[45] Date of Patent: * Mar. 10, 1992

[54] WIRE FEED APPARATUS

[75] Inventors: Toshiyuki Aso; Yasuo Arakawa, both of Yamanashi, Japan

[73] Assignee: Fanuc Ltd., Minamitsuru, Japan

[ * ] Notice: The portion of the term of this patent subsequent to May 29, 2007 has been disclaimed.

[21] Appl. No.: 629,031

[22] Filed: Dec. 19, 1990

Related U.S. Application Data

[63] Continuation of Ser. No. 315,686, Feb. 9, 1989, abandoned.

[30] Foreign Application Priority Data

Aug. 7, 1987 [JP] Japan .................. 62-196386

[51] Int. Cl.$^5$ .................. B65H 51/00; B65H 7/02; B65G 15/14
[52] U.S. Cl. .................. 226/172; 226/24; 219/69.12; 83/651.1; 198/626.4
[58] Field of Search .................. 226/172, 24, 171, 176; 219/69.12; 83/171, 651.1, 788; 198/626.4, 626.6

[56] References Cited

U.S. PATENT DOCUMENTS

| | | | |
|---|---|---|---|
| 2,742,144 | 3/1949 | Meyerbach | 226/172 X |
| 3,251,523 | 3/1963 | Reifenhauser et al. | 226/172 |
| 4,052,589 | 10/1977 | Reznocek | 83/778 X |
| 4,469,267 | 9/1984 | Fanchuk et al. | 226/172 |
| 4,547,647 | 10/1984 | Schneider | 217/69.12 |
| 4,652,716 | 3/1987 | Schneider et al. | 219/69.12 X |
| 4,814,572 | 3/1989 | Aso et al. | 219/69.12 |
| 4,880,957 | 11/1959 | Aso et al. | 219/69.12 |
| 4,929,809 | 5/1990 | Aso et al. | 226/172 X |

FOREIGN PATENT DOCUMENTS 0429584  7/1967  Switzerland .................. 226/172

*Primary Examiner*—Lenard A. Footland
*Assistant Examiner*—P. Bowen
*Attorney, Agent, or Firm*—Staas & Halsey

[57] ABSTRACT

A wire feed apparatus for a wire cut electric discharge machining apparatus, capable of moving a wire conveyor belt from an automatic wire extension position to a non-wire-transfer shunt position at the time of electric discharge machining, thereby preventing wear of the belts and reducing variation in the wire feed speed. The apparatus includes first and second conveyor belts selectively operated in accordance with predetermined conditions for wire feeding. At the time of automatic wire extension, an air cylinder of a wire feed mechanism is driven to move the second conveyor belt from a non-wire-transfer shunt position to the automatic wire extension position using a parallel link mechanism. The second conveyor belt is pressed against the first conveyor belt at the automatic wire extension position. When both these belts rotate as a motor is driven, a wire electrode held between the belts is transported from an upstream side of a wire transfer path to a downstream side thereof, whereupon the automatic wire extension is finished. When the air cylinder is de-energized, the second conveyor belt is restored to the non-wire-transfer shunt position and separated from the first conveyor belt by means of the urging force of a spring. Accordingly, the wire electrode and the two belts are out of contact with one another during the electric discharge machining operation, thus preventing wear of the belts and variation in wire feed speed.

5 Claims, 2 Drawing Sheets

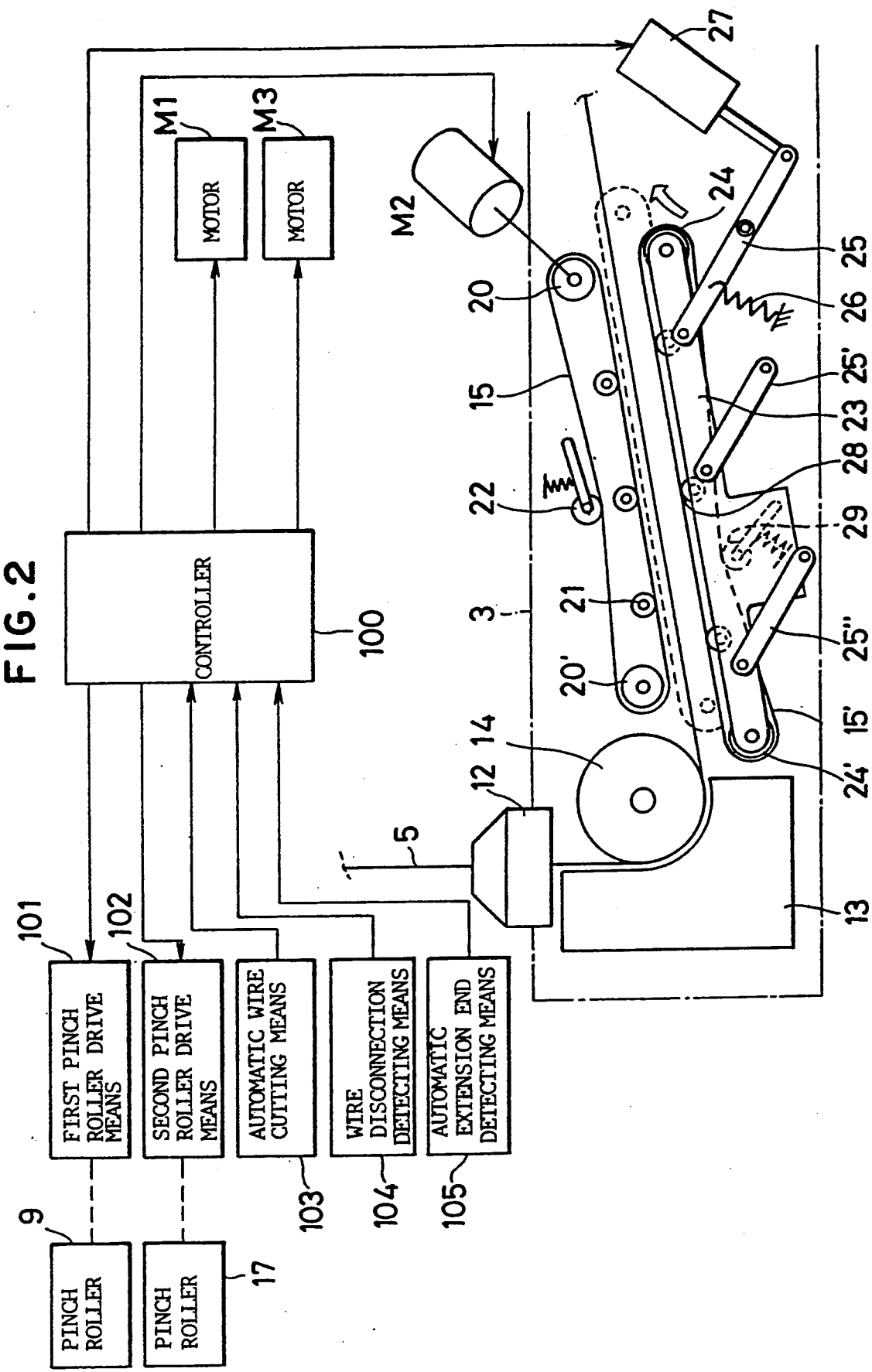

WIRE FEED APPARATUS

This application is a continuation of application Ser. No. 07/315,686, filed 2/9/89, now abandoned.

BACKGROUND OF THE INVENTION

1. Technical Field

The present invention relates to a wire feed apparatus for automatically extending wire electrodes (hereinafter referred to as wires) in a wire cut electric discharge machine, and more particularly, to a wire feed apparatus in which a wire conveyor belt is shunted from an automatic wire extension position at the time of electric discharge machining so that wear of the belt and variation in wire feed speed can be prevented.

2. Background Art

In general, a wire cut electric discharge machine is provided with an automatic wire extension apparatus for automatically stretching a wire which is artificially cut or snapped during machining. At the time of automatic wire extension, the wire is driven toward a workpiece by means of a send roller disposed in the vicinity of an upper guide located above the workpiece, and passes through an initial hole formed in the workpiece or a through hole formed in the middle of a machining path for the workpiece, and a lower guide disposed below the workpiece. Further, the wire is held between a pair of conveyor belts of a wire feed apparatus disposed on the lower-course side of the lower guide, and is transported toward a feed roller by means of these belts. After the automatic wire extension is finished in this manner, electric discharge machining is performed while the wire is being transported from the upper-course side of a wire transfer path toward the lower-course side thereof by means of the feed roller.

In the wire cut electric discharge machine with the automatic wire extension apparatus of the aforementioned type, the wire is transported by means of the feed roller at the time of the electric discharge machining after the end of the automatic wire extension, so that the wire feeding function of the wire feed apparatus is available only during the automatic wire extension. Conventionally, however, the wire is held between the conveyor belts of the wire feed apparatus, so that the conveyor belts are circulated so as not to hinder the wire feeding action of the feed roller.

However, the conveyor belts of the wire feed apparatus are not even in total thickness, and extend and contract as the ambient temperature varies. Also, each conveyor belt is constructed so that two opposite ends of a belt element constituting the same are connected in an endless manner, and a stepped portion is formed at the junction. Therefore, the conveyor belts are liable to rotate unevenly. Thus, even though the feed roller is rotated accurately at a predetermined speed, the wire is held between the unevenly rotating conveyor belts, so that the wire feed speed is liable to vary, thereby possibly entailing variation in electric discharge machining characteristic. Moreover, since the wire, transported by means of the feed roller, and the conveyor belts are in contact with one another, the belts can be easily worn away.

SUMMARY OF THE INVENTION

An object of the present invention is to provide a wire feed apparatus of a wire cut electric discharge machine, capable of shunting a wire conveyor belt from an automatic wire extension position at the time of electric discharge machining, thereby preventing wear of the belt and variation in wire feed speed.

In order to achieve the above object, a wire feed apparatus of the present invention comprises a first conveyor belt, a second conveyor belt movable toward and away from the first conveyor belt, means for moving the second conveyor belt between an automatic wire extension position, where the second conveyor belt is pressed against the first conveyor belt, and a shunt position, where the second conveyor belt is separated from the first conveyor belt, and drive means for rotating at least one of the first and second conveyor belts.

According to the present invention, as described above, the first and second conveyor belts, pressed against each other and holding a wire electrode therebetween, are rotated to transport the wire electrode at the time of automatic wire extension, and a force of pressure contact acting between the two conveyor belts is removed after the automatic wire extension. Thus, wear of the conveyor belts, attributable to contact with the wire electrode, and variation in the feed speed of the wire electrode, attributable to contact with the conveyor belts, after the automatic wire extension, can be prevented.

BRIEF DESCRIPTION OF THE DRAWINGS

FIG. 2 is a schematic side view showing the wire feed apparatus of FIG. 1.

DETAILED DESCRIPTION OF THE PREFERRED EMBODIMENTS

Figure 1:
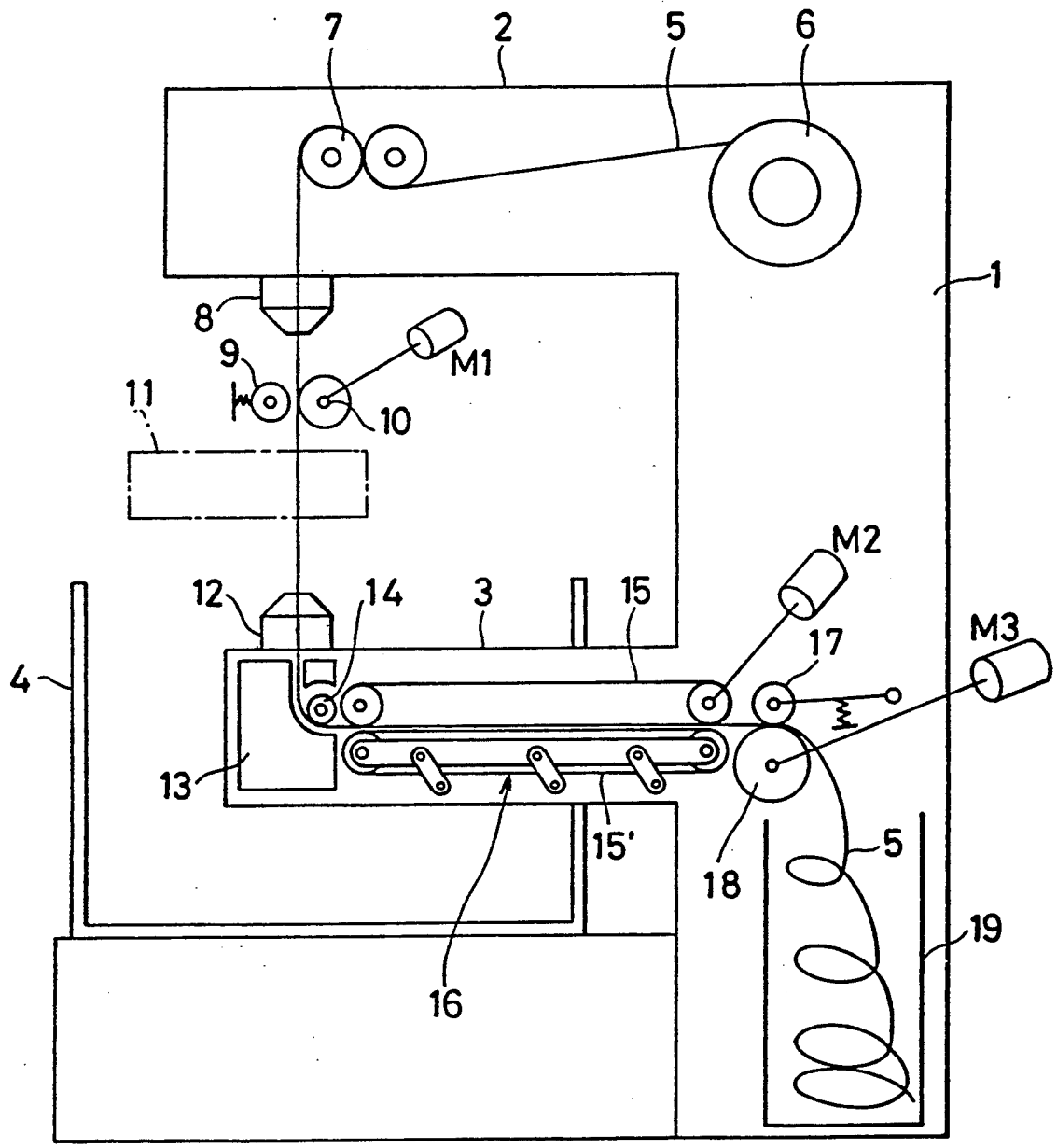
FIG. 1 is a schematic side view of a wire cut electric discharge machine furnished with a wire feed apparatus according to an embodiment of the present invention.

In FIG. 1, a wire cut electric discharge machine comprises a column 1, an upper arm 2 extending horizontally from the column 1, and a lower arm 3 extending parallel to the upper arm 2, from the column 1 through the side wall of a machining liquid pan 4 to the central portion of the pan 4. A wire supply bobbin 6 wound with a wire 5 is mounted on the upper portion of the column 1, and a brake roller 7 and an upper guide 8 are mounted on the upper arm 2. Disposed between the upper guide 8 and a workpiece 11, moreover, are a pinch roller 9 and a send roller 10 which is rotated by means of a motor M1. The lower arm 3 is fitted with a lower guide 12, which is located in alignment with the upper guide 8, a guide block 13, and a guide roller 14 facing the block 13. The elements 6 through 10 and 12 through 14 constitute part of a transfer path for the wire 5. Conventional automatic wire cutting means 103 (FIG. 2) including a cutter (not shown) and conventional wire disconnection detecting means 104 (FIG. 2) are disposed under the roller 10.

A wire feed apparatus 16, which is disposed on the lower-course side of the wire transfer path, comprises a pair of conveyor belts, i.e., first and second conveyor belts 15 and 15' (hereinafter referred to as first and second belts), and a motor M2 operatively connected to the first belt 15. A pinch roller 17, a feed roller 18 facing this roller and adapted to be rotated by means of a motor M3, and a wire recovery box 19 are disposed on the lower-course side of the wire feed apparatus 16.

Referring now to FIGS. 1 and 2, the wire feed apparatus 16 will be described in detail.

In the wire feed apparatus 16, the first and second belts 15 and 15' are arranged so that the outer peripheral surfaces of their respective advance-side halves, moving from the guide roller 14 toward the feed roller 18, face each other. The first belt 15 is passed between and around a driving pulley 20 operatively connected to the motor M2 and a driven pulley 20' spaced from the pulley 20. The outer peripheral surface of the advance-side half of the first belt 15 is normally spaced at a predetermined distance, e.g., 2 mm, upwardly, i.e., on the opposite side of the second belt with respect to the wire transfer path. Both pulleys 20 and 20' are rotatably supported by means of the lower arm 3. A plurality of guide pulleys 21, e.g., three in number, are arranged in contact with the inner peripheral surface of the advance-side half of the first belt 15 and with a space between them. Further, a tension pulley 22 for keeping the belt tension at a predetermined value is disposed in engagement with the outer peripheral surface of the return-side half of the belt 15.

The second belt 15' is passed between and around pulleys 24 and 24', which are rotatably supported at two opposite ends of a frame 23, so that the belt 15' is movable integrally with the frame 23 between a shunt position indicated by full line in FIG. 2 and an automatic wire extension position indicated by broken line. More specifically, the frame 23 constitutes a parallel link mechanism, in conjunction with first through third leg links 25, 25' and 25", each having one end swingably supported on the frame and extending parallel to one another. A middle pivotal point of the first leg link 25 and the respective other ends of the second and third leg links 25' and 25" are rockably supported by means of the lower arm 3, and the other end of the first leg link 25 is coupled to a movable member of an air cylinder 27. The first leg link 25 is continually urged toward the shunt position by means of a spring 26 which has one end coupled to the frame-side half of the link.

In FIG. 2, reference numerals 28 and 29 denote a guide roller and a tension pulley, respectively, which are rotatably supported by means of the frame 23. Further, reference numeral 100 denotes a controller of the electric discharge machine. The controller is connected, in controllable relation, to the motors M1 through M3, the air cylinder 27, first and second pinch roller drive means 101 and 102 for moving the pinch rollers 9 and 17 toward and away from the rollers 10 and 18, respectively, the automatic wire cutting means 103, the wire disconnection detecting means 104, and conventional automatic extension end detecting means 105.

In the following, the operation of the electric discharge machine as constructed above will be explained.

When an automatic wire cutting end signal is delivered from the automatic wire cutting means to the controller 100 upon occurrence of a shift from cutting-out machining to subsequent cutting-out machining during the course of a series of cutting-out machining, or when a wire disconnection detecting signal is delivered from the wire disconnection detecting means 104 to the controller 100 during electric discharge machining, for instance, automatic wire extension is performed as mentioned below.

At the time of automatic wire extension, the controller 100 first energizes the motor M3 and the second pinch roller drive means 102. As a result, an unnecessary lower-course-side portion of the wire 5, automatically cut or snapped, is held between the pinch roller 17 and the feed roller 18 at the location thereof, and is cast away into the wire recovery box 19 as the feed roller 18 is rotated by the drive of the motor M3.

Then, the controller 100 actuates the air cylinder 27. As the cylinder operates, the first leg link 25, the one end of which is coupled to the movable member of the cylinder 27, swings together with second and third leg links 25' and 25" in the clockwise direction of FIG. 2, against the urging force of the spring 26. As a result, the second belt 15', movable integrally with the frame 23, moves from the shunt position indicated by full line to the automatic wire extension position indicated by broken line, while maintaining the parallel positional relationship between the outer peripheral surfaces of the respective advance-side halves of the first and second belts. In the automatic wire extension position, the outer peripheral surface of the advance-side half of the second belt 15' is pressed against that of the first belt 15. Then, the controller 100 drives the motors M1 and M2 to rotate, and also energizes the first pinch roller drive means 101. When the driving pulley 20 rotates accompanying the rotating of the motor M2, the first belt 15 rotates in the counterclockwise direction, and the second belt 15', pressed against the first belt, rotates clockwise in a driven manner.

Meanwhile, an automatically cut or snapped upper-course-side portion of the wire 5, i.e., a new wire 5, passes through an initial hole (not shown) formed in the workpiece 11, or a through hole (not shown) in the middle of a machining path for the workpiece 11, and the lower guide 12, and then passes between the guide block 13 and the guide roller 14, as the supply roller 10 is driven to rotate by the motor M1, as is generally known. At the starting ends of first and second belts 15 and 15', the new wire 5 is held between the outer peripheral surfaces of the respective advance-side halves of the two belts. Then, the wire 5 is transported toward the terminal ends of the two belts 15 and 15' by means of the belts in circulatory motion. At their terminal ends, the belts 15 and 15' cause the wire 5 to project toward the region between the pinch roller 17 and the feed roller 18, whereupon the wire 5 is held between the two rollers 17 and 18. Further, the wire 5 is transferred to the wire recovery box 19 by the feed roller 18 which is rotated by means of the motor M3. Thus, the automatic wire extension is finished, which is detected by the automatic wire extension end detecting means 105.

In response to an automatic wire extension end signal from this detecting means, the controller 100 stops the drive of the motors M1 and M2, and de-energizes the air cylinder 27 and the first pinch roller drive means 101. As the motor M2 ceases to rotate, the circulatory motion of the first and second belts 15 and 15' is stopped. As the air cylinder 27 is de-energized, moreover, the first leg link 25 is swung in the counterclockwise direction of FIG. 2 by the urging force of the spring 26. As a result, the second belt 15' moves integrally with the frame 23, from the automatic wire extension position toward the shunt position. Since the outer peripheral surface of the advance-side half of the first belt 15 is on that side of the normal wire transfer path remote from the second belt, the wire 5 is out of contact with the two belts 15 and 15'.

When the wire feed apparatus 16 is brought to a shunt state in this manner, electric discharge machining is started, and the used wire 5 is transported toward the wire recovery box 19 at a predetermined feed speed as the feed roller 18 is driven to rotate by the motor M3.

At this time, the wire 5 and the belts 15 and 15' of the wire feed apparatus 16 are kept out of contact with one another. Thus, the belts 15 and 15' are not subject to wear attributable to contact with the wire 5, and there is no variation in the feed speed of the wire caused by contact with these belts.

Although the parallel link mechanism is used, in the embodiment described above, to move the second belt 15' toward and away from the first belt 15 in parallel relation to the first belt 15, the present invention is not limited to this arrangement. For example, a cam mechanism (not shown) may be used which is a combination of a cam follower provided on the frame 23 and a cam groove formed on the lower arm 3.

What is claimed is:

1. A wire feed apparatus for use in a wire cut electric discharge machine, which apparatus is arranged to automatically extend a wire electrode along a wire transfer path after disconnection of the wire electrode is detected, and arranged to drive roller means disposed in the wire transfer path and located downstream of a workpiece, so as to transfer the wire electrode along the wire transfer path during electric discharge machining which starts after completion of the automatic wire extension is detected, said apparatus comprising:
   (a) a first conveyer belt positioned on one side of the wire transfer path and located downstream of the workpiece:
   (b) a second conveyer belt positioned on the other side of the wire transfer path and located downstream of the workpiece, said second conveyer belt being movable toward the first conveyer belt to an automatic wire-transfer extension position, where the second conveyer belt is pressed against the first conveyer belt, and away from the first conveyer belt to a non-wire-transfer shunt position, where the second conveyer belt is separated from the first conveyer belt;
   (c) drive means for rotating at least one of the first and second conveyer belts, said drive means cooperating with said first conveyer belt and said second conveyer belt which assumes said automatic wire-transfer extension position, to constitute transfer means for transferring said wire electrode along the wire transfer path, said transfer means being independent from said roller means;
   (d) means for moving said second conveyer belt between the automatic wire-transfer extension position and the non-wire-transfer shunt position;
   (e) control means for driving said moving means so as to move said second conveyer belt to said automatic wire-transfer extension position and for driving said drive means so as to cause said at least one conveyer belt to rotate, after detection of disconnection of said wire electrode, said control means being operable to drive said moving means so as to move said second conveyer belt to said non-wire-transfer shunt position after the detection of the completion of the automatic wire extension, whereby said wire electrode is transferred by said roller means along the wire transfer path during the electric discharge machining.

2. A wire feed apparatus according to claim 1, wherein said first conveyer belt is separated from the wire transfer path at a predetermined distance therefrom on the side remote from said second conveyer belt.

3. A wire feed apparatus according to claim 1 or 2, wherein said first conveyer belt is driven by said drive means, and said second conveyer belt is driven by said drive means when in said automatic wire extension position to rotate as said first conveyor belt rotates.

4. A wire feed apparatus according to claim 1 or 2, wherein said first and second conveyer belts are arranged parallel to each other, and said moving means moves said second conveyor belt between said automatic wire extension position and said non-wire-transfer shunt position while maintaining the parallel arrangement.

5. A wire feed apparatus according to claim 4, wherein said second conveyor belt is stretched between pulleys, and said moving means includes a parallel link mechanism, having a frame supporting both said pulleys and a plurality of leg links each having one end swingably coupled to said frame and extending parallel to one another, and means for swinging at least one of said plurality of leg links.

* * * * *